United States Patent
Sata (10) Patent No.: US 9,777,835 B2
(45) Date of Patent: Oct. 3, 2017

(54) SYSTEM AND METHOD FOR DETERMINING WHETHER A CVT IS SET TO A MAXIMUM GEAR RATIO AT VEHICLE STARTUP

(71) Applicant: Toyota Motor Engineering & Manufacturing North America, Inc., Erlanger, KY (US)

(72) Inventor: Andrew G. Sata, Northridge, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 84 days.

(21) Appl. No.: 14/792,465

(22) Filed: Jul. 6, 2015

(65) Prior Publication Data

US 2017/0009880 A1    Jan. 12, 2017

(51) Int. Cl.
| | | |
|---|---|---|
| F16H 59/00 | (2006.01) | |
| F16H 61/00 | (2006.01) | |
| F16H 63/00 | (2006.01) | |
| F16H 61/662 | (2006.01) | |
| F16H 9/18 | (2006.01) | |
| F16H 61/02 | (2006.01) | |

(52) U.S. Cl.
CPC ............. *F16H 61/662* (2013.01); *F16H 9/18* (2013.01); *F16H 61/0204* (2013.01)

(58) Field of Classification Search
CPC ......... F16H 61/66272; F16H 61/66259; Y10T 477/6242; Y10T 477/6237; Y10T 477/624
USPC ......................................................... 474/28
See application file for complete search history.

(56) References Cited

U.S. PATENT DOCUMENTS

| | | | |
|---|---|---|---|
| 5,672,137 | A | 9/1997 | Adachi et al. |
| 5,853,347 | A | 12/1998 | Aoki et al. |
| 7,039,516 | B2 | 5/2006 | Yamaguchi et al. |
| 7,338,406 | B2 | 3/2008 | Shimoda |
| 7,699,729 | B2 | 4/2010 | Inoue et al. |
| 7,824,307 | B2 | 11/2010 | Matsubara et al. |
| 8,412,636 | B2 | 4/2013 | Katou |
| 8,585,542 | B2 | 11/2013 | Takahashi et al. |
| 2012/0083978 | A1 | 4/2012 | Tajima et al. |
| 2013/0080008 | A1 | 3/2013 | Tanaka et al. |

(Continued)

FOREIGN PATENT DOCUMENTS

| | | |
|---|---|---|
| JP | 2006292077 | 10/2006 |
| KR | 2007080818 | 8/2007 |
| KR | 20140092442 | 7/2014 |

*Primary Examiner* — Henry Liu
(74) *Attorney, Agent, or Firm* — Snell & Wilmer LLP (57) ABSTRACT

A system includes a continuously variable transmission having a primary pulley assembly configured to receive power and a primary oil chamber coupled to the primary pulley assembly such that a pressure of oil within the primary oil chamber is applied to the primary pulley assembly. The continuously variable transmission also includes a secondary pulley assembly and a drive belt configured to transfer power from the primary pulley assembly to the secondary pulley assembly. The system also includes a pressure sensor coupled to the primary oil chamber and configured to detect a pressure of the oil within the primary oil chamber. The system also includes an electronic control unit coupled to the pressure sensor and configured to determine whether the continuously variable transmission is set to the maximum gear ratio based on the detected pressure of the oil within the primary oil chamber.

13 Claims, 8 Drawing Sheets

(56) References Cited

U.S. PATENT DOCUMENTS

2014/0224060 A1 8/2014 Murata
2014/0257653 A1 9/2014 Sato et al.

SYSTEM AND METHOD FOR DETERMINING WHETHER A CVT IS SET TO A MAXIMUM GEAR RATIO AT VEHICLE STARTUP

BACKGROUND

1. Field

The present disclosure relates to a system and method for determining whether the gear ratio of a continuously variable transmission (CVT) that uses pulleys is set to a maximum gear ratio at startup based on detected pressures within oil chambers coupled to the pulleys.

2. Description of the Related Art

Various types of continuously variable transmissions, or CVTs, for automobiles have been introduced to the marketplace. One of these CVTs utilizes variable-diameter pulleys including a primary, or drive, pulley assembly that is mechanically coupled to an engine and/or a motor generator. The pulleys also include a secondary, or driven, pulley assembly that is mechanically coupled to an output device, such as an axle. The two pulley assemblies are typically aligned and a drive belt is coupled to and received by both pulley assemblies so power can be transferred from the primary pulley assembly to the secondary pulley assembly. The pulley assemblies each include two pulleys, each of which has a conic shape with the apexes pointing towards each other, creating an hourglass shape. The relative location of the two pulleys of each pulley assembly can be controlled so that the pulleys are farther apart or closer together. For example, an oil chamber may be coupled to each of the pulley assemblies and pressure within the oil chambers can affect the position of the pulleys relative to each other. When the pulleys are farther apart, the effective radius of the belt about the pulley assembly is smaller than when the pulleys are closer together. Accordingly, the gear ratio may be increased by decreasing the radius of the primary pulley assembly and by increasing the radius of the secondary pulley assembly. Thus, the gear ratio of the CVT may be adjusted by varying the pressures within the oil chambers coupled to each pulley assembly.

It is desirable for a CVT of a vehicle to maintain oil pressure that provides sufficient force through the pulleys and to the belt such that relative rotation between the belt and pulleys is suppressed. This pressure may be different for various transmission unit designs. In many CVT type transmissions, a gear ratio may be designed to maintain sufficient force to the belt without applied oil pressure, and a gear ratio other than that which is designed to maintain sufficient force to the belt may allow relative rotation between the belt and the pulleys. This situation may arise during vehicle startup when oil pressure is not yet great enough to apply a sufficient force to the belt, causing undesirable wear of the pulleys and/or the drive belt. It is common that the maximum allowable gear ratio is designed to provide sufficient force to prevent relative rotation. If a control system of the vehicle is aware of whether the gear ratio is the maximum allowable gear ratio, the control system can utilize additional controls to protect the pulleys and/or the drive belt.

Traditionally, angular velocities detected at each pulley assembly are compared in order to determine gear ratios of the CVT. However, angular velocity sensors used in CVTs may not provide accurate data while the angular velocity of the pulley assembly is below a predetermined amount, such as 150 revolutions per minute (rpm). Accordingly, it is desirable to have systems and methods for determining whether a CVT is operating at a maximum gear ratio during and after engine startup.

SUMMARY

Described herein is a system for determining whether a transmission of a vehicle is set to a maximum gear ratio during startup. The system includes a continuously variable transmission (CVT) having a primary pulley assembly configured to receive power and including a primary fixed pulley and a primary sliding pulley. The CVT also includes a primary oil chamber coupled to the primary pulley assembly such that the pressure of oil within the primary oil chamber is applied to the primary pulley assembly. The CVT also includes a secondary pulley assembly including a secondary fixed pulley and a secondary sliding pulley. The CVT also includes a drive belt configured to transfer power from the primary pulley assembly to the secondary pulley assembly. The system also includes a pressure sensor coupled to the primary oil chamber and configured to detect a pressure of the oil within the primary oil chamber. The system also includes an electronic control unit coupled to the pressure sensor and configured to determine whether the CVT is set to the maximum gear ratio based on the detected pressure of the oil within the primary oil chamber.

Also described is a method for determining whether a CVT of a vehicle having a primary pulley assembly, a secondary pulley assembly, and an oil chamber coupled to the primary pulley assembly, is set to a maximum gear ratio. The method includes detecting, by a pressure sensor, a pressure of oil in the oil chamber. The method also includes determining, by an electronic control unit, a target pressure of the oil in the oil chamber. The method also includes determining, by the electronic control unit, whether the CVT is set to the maximum gear ratio based on a comparison of the detected pressure of the oil in the oil chamber and the target pressure of the oil in the primary oil chamber.

Also described is a method for protecting a drive belt of a CVT of a vehicle, the transmission having a primary pulley assembly, a secondary pulley assembly, and an oil chamber coupled to the primary pulley assembly. The method includes determining, by an electronic control unit, that an engine of the vehicle has started. The method also includes determining, by the electronic control unit, whether the CVT is in a park gear or a neutral gear. The method also includes determining, by a pressure sensor coupled to the oil chamber, a pressure of oil within the oil chamber. The method also includes determining, by the electronic control unit, whether the CVT is functioning at a maximum gear ratio based on the detected pressure of the oil in the oil chamber when the CVT is in the park gear or the neutral gear.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Disclosed herein are systems and methods for determining whether a continuously variable transmission (CVT) of a vehicle is set to a maximum gear ratio during and after startup of the vehicle. The systems include a CVT that utilizes variable diameter pulleys. In particular, the systems include a primary pulley assembly and a secondary pulley assembly each coupled to a drive belt such that power can be transferred from the primary pulley assembly to the secondary pulley assembly via the drive belt. A primary oil chamber is positioned adjacent to the primary pulley assembly and a secondary oil chamber is positioned adjacent to the secondary pulley assembly. In that regard, the gear ratio of the CVT may be changed by adjusting the pressures within each of the oil chambers. A pressure sensor is coupled to the primary oil chamber and can detect the pressure within the primary oil chamber. The systems also include an electronic control unit (ECU) that includes logic for determining whether the CVT is set to the maximum gear ratio while the vehicle is starting.

Having an ECU that can determine whether the CVT is set to the maximum gear ratio provides several benefits and advantages for the vehicle and for the user. Due to the fact that the oil chambers are not at the desired pressures while the engine is starting, insufficient pressure within one of the oil chambers can cause relative movement of the drive belt, which may cause wear to the pulley assemblies and/or the drive belt. Therefore, a CVT transmission is typically designed so that sufficient force is applied to the belt at a particular gear ratio, such as the maximum gear ratio, even when oil pressure is not applied to the pulley. Because the ECU can determine that the CVT is not set to the maximum gear ratio, the ECU can perform logic that will prevent this unnecessary wear of the pulley assemblies and the drive belt. Inclusion of the pressure sensor provides benefits in addition to the determination of whether the CVT is operating at the maximum gear ratio. Traditional ECU's may utilize detected angular velocities of the pulley assemblies to determine gear ratios and/or to control the pressures within the oil chambers. The pressure sensor can also be used as a replacement and/or a supplement for controlling the pressures within the oil chambers. The pressure sensor can also be used to improve accuracy of the pressure control systems.

Figure 1:
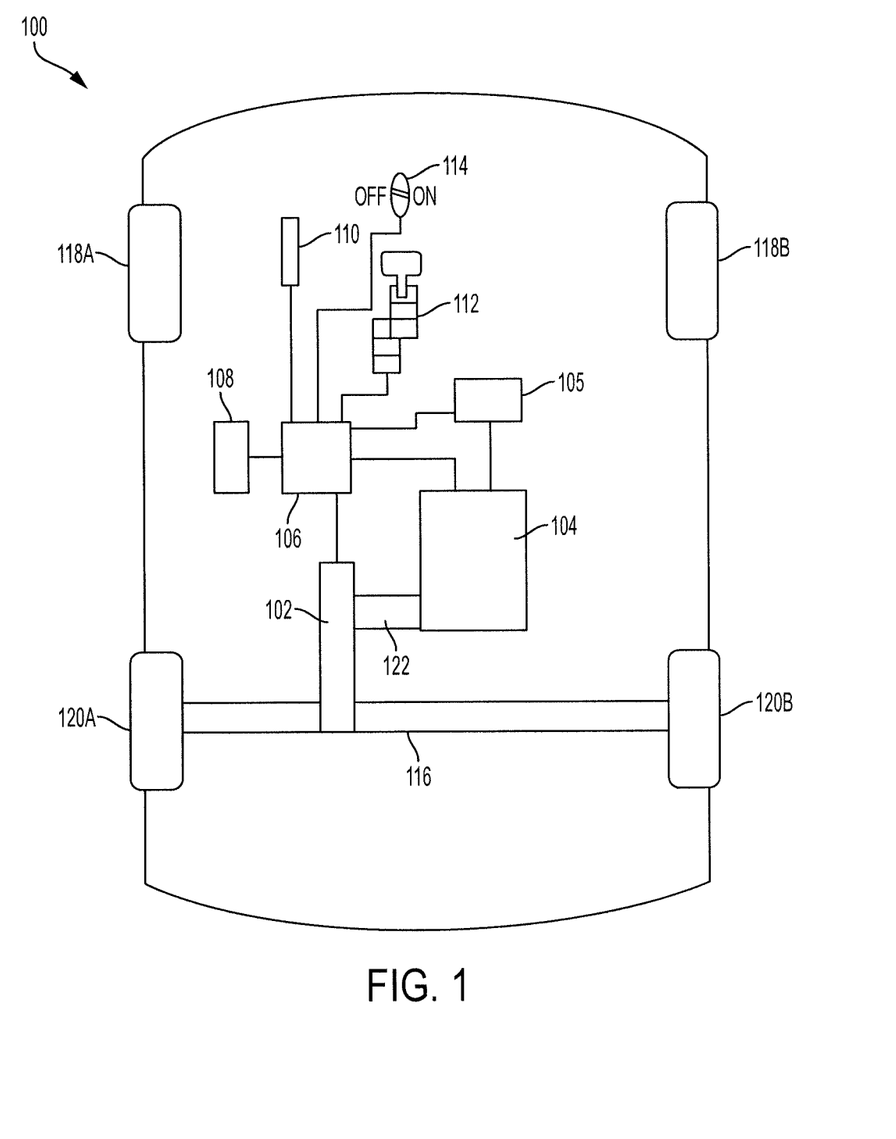
FIG. 1 is a block diagram illustrating a vehicle capable of determining whether a transmission is operating at a maximum gear ratio during startup according to some embodiments of the present disclosure.

With reference now to FIG. 1, a vehicle 100 may include an engine 104 mechanically coupled to a transmission 102 via a shaft 122. The transmission 102 is also coupled to rear wheels 120, including a left rear wheel 120A and a right rear wheel 120B, via an axle 116. In some embodiments, the transmission 102 may instead or additionally be coupled to front wheels 118, including a left front wheel 118A and a right front wheel 118B. In some embodiments, a differential (not shown) may be coupled between the transmission 102 and the axle 116 to allow relative rotation of the wheels on either side of the vehicle 100. The vehicle 100 may also include a starter motor 105 coupled to the engine 104, as well as an accelerator pedal 110, an ignition switch 114, and a gear shifter 112. The transmission 102, the engine 104, the starter motor 105, the accelerator pedal 110, the ignition switch 114, and the gear shifter 112 may each be coupled to an ECU 106. The ECU 106 may also be coupled to a memory 108.

The engine 104 may be an internal combustion engine capable of combusting a fuel to generate mechanical power, such as rotation having torque and an angular velocity. In some embodiments, the vehicle 100 may have a motor generator and a battery instead of or in addition to the engine 104. The motor generator may convert electric charge stored in the battery into mechanical power. In that regard, the vehicle 100 may be a gas-powered vehicle, an electric vehicle, or a hybrid vehicle. In some embodiments, the vehicle 100 may also be a fuel cell based vehicle or a hybrid vehicle that utilizes fuel cell technology.

In some embodiments, the transmission 102 may be a CVT that utilizes variable diameter pulley assemblies. The transmission 102 may receive power from the engine 104 via the shaft 122. The transmission 102 can transfer the power received from the shaft 122 to the axle 116 in order to cause rotation of the rear wheels 120. The transmission 102 may provide the power to the axle 116 at a different torque and/or angular velocity than the power received from the engine 104. In that regard, the transmission 102 is variable, meaning that it can be set to any of a plurality of gear ratios.

The starter motor 105 may be coupled to a battery (not shown) that powers the starter motor 105. When the starter motor 105 is running, it generates power that may be used to start the engine 104.

The electronic control unit (ECU) 106 may be electrically coupled to the transmission 102 and to the engine 104. The ECU 106 may receive input from various components and may control the operation of the transmission 102 and/or the engine 104 based on control logic utilizing the received inputs. The ECU 106 may receive inputs from the accelerator pedal 110, the ignition switch 114, and/or the gear shifter 112, as well as various other components, such as the transmission 102. The input received from the accelerator pedal 110 may indicate an amount of acceleration requested by a driver. The input received from the gear shifter 112 may indicate a desired gear ratio or a range of gear ratios for the transmission 102 to be set to, as requested by the driver. For example, a driver may place the gear shifter 112 in a first gear position indicating a higher gear ratio than a fifth gear position, a park gear position, a neutral gear position, or any other gear position. The input received from the ignition switch 114 (i.e., whether the ignition switch 114 is placed in an "on" or "off" position) may indicate whether the driver would like for the vehicle (and thus the engine 104) to turn on or turn off. In response to the ignition switch turning from an off state to an on state, the ECU 106 may instruct the starter motor 105 to generate power for a predetermined amount of time to start the engine 104.

The memory 108 may be coupled to the ECU 106 and may include a RAM or other volatile or nonvolatile memory. The memory 108 may be a non-transitory memory or a data storage device, such as a hard disk drive, a solid state disk drive, a hybrid disk drive, or other appropriate data storage, and may further store machine-readable instructions which may be loaded and executed by the ECU 106.

Figure 2:
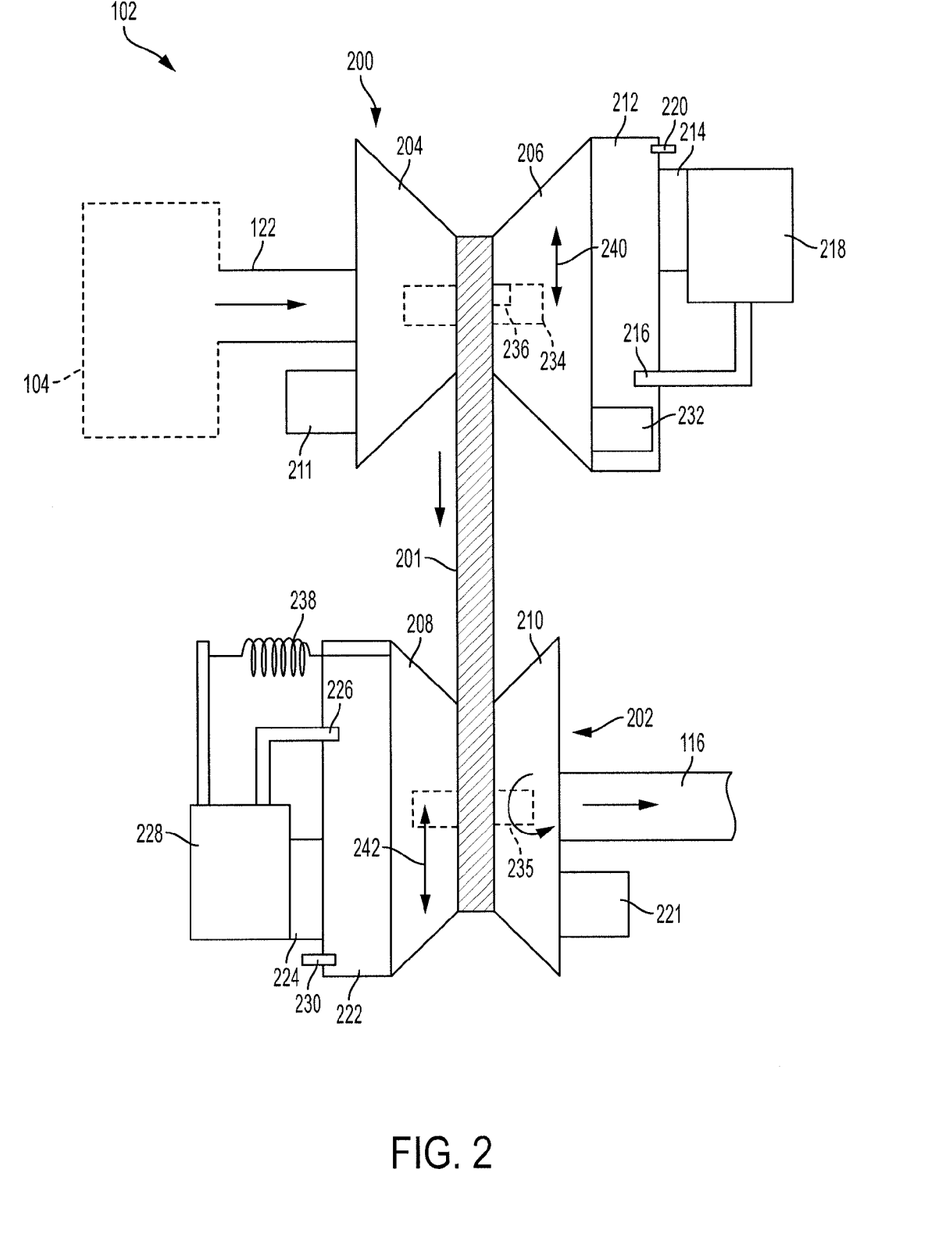
FIG. 2 is a drawing of a continuously variable transmission that uses variable diameter pulleys according to some embodiments of the present disclosure.

With reference now to FIG. 2, the transmission 102 may include a primary pulley assembly 200 and a secondary pulley assembly 202. The primary pulley assembly 200 may be coupled to the shaft 122 and receive power from the engine 104 via the shaft 122. The primary pulley assembly 200 may be coupled to the secondary pulley assembly 202 via a drive belt 201. In response to rotation of the primary pulley assembly 200, power is transferred to the secondary pulley assembly 202 via the drive belt 201. The power transferred through the drive belt 201 causes the secondary pulley assembly 202 to rotate, transferring the power to the axle 116.

The primary pulley assembly 200 may include a primary fixed pulley 204 and a primary sliding pulley 206 each coupled to a primary pulley shaft 234. Depending on a desired gear ratio of the transmission 102, the primary fixed pulley 204 and the primary sliding pulley 206 may be forced together or apart using various mechanisms. In that regard, the primary sliding pulley 206 may move relative to the primary fixed pulley 204. Thus, the primary pulley assembly 200 is a variable diameter pulley assembly. As the primary sliding pulley 206 is forced towards the primary fixed pulley 204, a pitch radius 240 of the primary pulley assembly 200 is increased. As the pitch radius 240 increases, the gear ratio of the transmission 102 has a tendency to decrease. When used herein, the term "gear ratio" refers to the actual gear ratio and not a numerical gear such as first gear.

In a similar manner, the secondary pulley assembly 202 includes a secondary fixed pulley 210 and a secondary sliding pulley 208 each coupled to a secondary pulley shaft 235. The secondary sliding pulley 208 may move relative to the secondary fixed pulley 210. In that regard, the secondary sliding pulley 208 may be forced towards or away from the secondary fixed pulley 210 using various mechanisms. As the secondary sliding pulley 208 is forced towards the secondary fixed pulley 210, a pitch radius 242 of the secondary pulley assembly 202 is increased. As the pitch radius 242 of the secondary pulley assembly 202 increases, the gear ratio of the transmission 102 has a tendency to increase. In order to retain tension in the drive belt, it is desirable for the pitch radius 240 of the primary pulley assembly 200 to decrease when the pitch radius 242 of the secondary pulley assembly 202 increases, and vice versa. Accordingly, to set the transmission 102 to the highest gear ratio, the pitch radius 240 of the primary pulley assembly 200 should be at a minimum and the pitch radius 242 of the secondary pulley assembly 202 should be at a maximum. Where utilized herein, when the transmission 102 is "set to" a particular gear ratio, the pitch radii of the pulley systems are set such that the transmission 102 will transfer any power at the particular gear ratio.

A linear position sensor 236 may be coupled to the primary pulley shaft 234 and be capable of detecting a linear position of the sliding pulley 206 relative to the primary fixed pulley 204. In some embodiments, the linear position sensor 236 may be capable of detecting a linear position of the sliding pulley 206 relative to another fixed component of the transmission 102. This detected position may be used to verify a gear ratio of the transmission 102.

A primary oil chamber 212 is positioned adjacent to the primary pulley assembly 200. The primary oil chamber 212 may define a cavity for receiving fluid, such as oil, and may have a mechanism for transferring internal pressure to an external device, such as the primary pulley assembly 200. A primary oil pump 214 is positioned between a primary reservoir 218 and the primary oil chamber 212. The primary oil pump 214 is capable of receiving fluid from the primary reservoir 218 and pumping the fluid into the primary oil chamber 212, causing pressure within the primary oil chamber 212 to increase. In some embodiments, the primary oil pump 214 is also capable of pumping oil from the primary oil chamber 212 to the primary reservoir 218.

The primary oil chamber 212 may also be coupled to the primary reservoir 218 via a primary release valve 216. In some embodiments, the pressure release valve 216 couples the primary oil chamber 212 to a relatively low pressure oil reservoir or a low pressure chamber of the primary reservoir 218. In some embodiments, and in response to a signal from the ECU 106 of FIG. 1, the primary release valve 216 may release in response to the pressure within the primary oil chamber 212 reaching a predetermined amount. In some embodiments, the primary release valve 216 may be triggered by the pressure differential between the primary oil chamber 212 and the target pressure. For example, the pressure in the primary oil chamber 212 may become so great that it forces the primary release valve 216 to open, allowing fluid to flow from the primary oil chamber 212 to the low pressure reservoir or low pressure chamber of the primary reservoir 218.

A primary pressure sensor 220 may be coupled to the primary oil chamber 212 and configured to determine a pressure of the fluid within the primary oil chamber 212. This detected pressure may be used as an input to the ECU 106 of FIG. 1.

The pitch radius 240 of the primary pulley assembly 200 may be changed by varying the pressure of the fluid within the primary oil chamber 212. For example, as the pressure within the primary oil chamber 212 is increased, the primary sliding pulley 206 may be forced towards the primary fixed pulley 204, increasing the pitch radius 240.

In a similar manner, the secondary pulley assembly 202 is coupled to a secondary oil chamber 222 such that pressure within the secondary oil chamber 222 is applied to the secondary sliding pulley 208. A secondary oil pump 224 is coupled to a secondary reservoir 228 and to the secondary oil chamber 222 and may pump oil from the secondary reservoir 228 into the secondary oil chamber 222 and/or may pump oil from the secondary oil chamber 222 to the secondary reservoir 228. The primary oil pump 214 and/or the secondary oil pump 224 may be mechanical and/or electrical oil pumps. A secondary release valve 226 may be configured to release and allow oil to flow from the secondary oil chamber 222 to the secondary reservoir 228 in response to sufficient pressure within the secondary oil chamber 222. A secondary pressure sensor 230 may be coupled to the secondary oil chamber 222 and be capable of detecting a pressure of the fluid within the secondary oil chamber 222. The detected pressure may be received by the ECU 106 of FIG. 1.

The pitch radius of the primary pulley assembly 200 may also be adjusted based on the pitch radius of the secondary pulley assembly 202 as well as the pressure within the secondary oil chamber 222. A pressure may be applied to the secondary oil chamber 222 such that the pitch radius of the secondary pulley assembly 202 is increased. The increased pitch radius may in turn increase tension on the drive belt 201. The increased tension may then be applied to the primary pulley assembly 200 and cause the primary sliding pulley 206 to separate from the primary fixed pulley 204, effectively changing the pitch radius of the primary pulley assembly 200.

The transmission 102 also may include a return spring 238 coupled between the secondary sliding pulley 208 and a fixed portion of the transmission 102, such as to the secondary reservoir 228, the secondary oil pump 224, or the like. The return spring 238 may be a compression spring and apply a force to the secondary sliding pulley 208. This effectively results in the return spring 238 applying force to hold the transmission 102 in a particular gear ratio. In particular, the return spring 238 may assist in causing the transmission 102 to remain in a maximum gear ratio. However, the return spring 238 only includes enough tension to cause the transmission 102 to remain in a given gear ratio, it is not sufficient to cause the transmission 102 to shift between gear ratios.

The transmission 102 may also include a mechanical stop 232 coupled to a fixed portion of the transmission 102 such as the primary reservoir 218, the primary oil pump 214, or the like. When the transmission 102 is in the maximum gear ratio, the primary sliding pulley 206 may be positioned adjacent to the mechanical stop 232. The mechanical stop 232 may cause the primary sliding pulley 206 to resist further separation from the primary fixed pulley 204. The mechanical stop 232 may be capable of rotating with the primary sliding pulley 206; however, the mechanical stop 232 resists axial movement relative to the shaft 122.

One skilled in the art will realize that a transmission may vary in design from the transmission 102 without departing from the scope of the present disclosure. For example, a single oil pump may generate oil pressure to be delivered to a valve body which controls distribution of the oil to various components of the transmission via one or more actuators. As another example, a primary and secondary pulley assembly may comprise a single variable pulley.

With reference now to FIGS. 1 and 2, when the ignition switch 114 is switched to the on state, it is desirable for the transmission 102 to be in the maximum gear ratio. However, during startup of the vehicle 100, it is possible for the transmission 102 to be set to a gear ratio other than the maximum gear ratio. This may be caused by the vehicle 100 decelerating faster than the transmission 102 (i.e., a quick stop) or turning the vehicle 100 off at a high rotational speed. Additionally, during startup, the primary oil chamber 212 and/or the secondary oil chamber 222 may not yet be filled with fluid and/or fully pressurized, so it is not possible to immediately shift the transmission 102 into the maximum gear ratio.

In order to ensure that the gear ratio is set to the maximum gear ratio, the pressure within the secondary oil chamber 222 is set to a level relative to the primary oil chamber 212 such that the pulleys tend to downshift to a higher gear ratio. Thus, when the transmission 102 is shifting to the maximum gear ratio, the tension applied to the drive belt 201 by the secondary pulley assembly 202 may be sufficient to cause the primary sliding pulley 206 to separate from the primary fixed pulley 204. As the ECU 106 may assume that the transmission 102 is in the maximum gear ratio, an insufficient oil pressure in the primary oil chamber 212 may be requested, allowing the primary sliding pulley 206, the primary fixed pulley 204, and/or the drive belt 201 to slip relative to each other in the radial and axial directions. As a result of this slipping, the drive belt 201 and/or the primary pulley assembly 200 may be exposed to unnecessary wear.

However, if the ECU 106 is aware or can determine that the gear ratio of the transmission 102 is not set to the maximum gear ratio, the ECU 106 may control components of the vehicle 100 to reduce the likelihood of unnecessary wear to the drive belt 201 and/or the primary pulley assembly 200. For example, the ECU 106 may restrict an amount of torque applied to the transmission 102 until the transmission 102 is in the maximum gear ratio.

The transmission 102 may include a primary angular velocity sensor 211 and a secondary angular velocity sensor 221. In traditional vehicles, an ECU may determine the gear ratio based on the detected angular velocities of the pulley systems. The ECU 106 can likewise determine gear ratios based on the angular velocities of the primary pulley assembly 200 and the secondary pulley assembly 202. However, angular velocity sensors may not accurately detect angular velocities below a threshold angular velocity. For example, some angular velocity sensors cannot accurately detect angular velocities below 200 revolutions per minute (RPM). Thus, during startup, the ECU 106 cannot determine a gear ratio based on the data detected by the primary angular velocity sensor 211 and the secondary angular velocity sensor 221. However, the ECU 106, unlike traditional ECUs, may use detected pressure data from the primary pressure sensor 220 and/or the secondary pressure sensor 230 to determine or estimate whether the transmission 102 is set to a maximum gear ratio during startup of the vehicle 100.

Figure 3A:
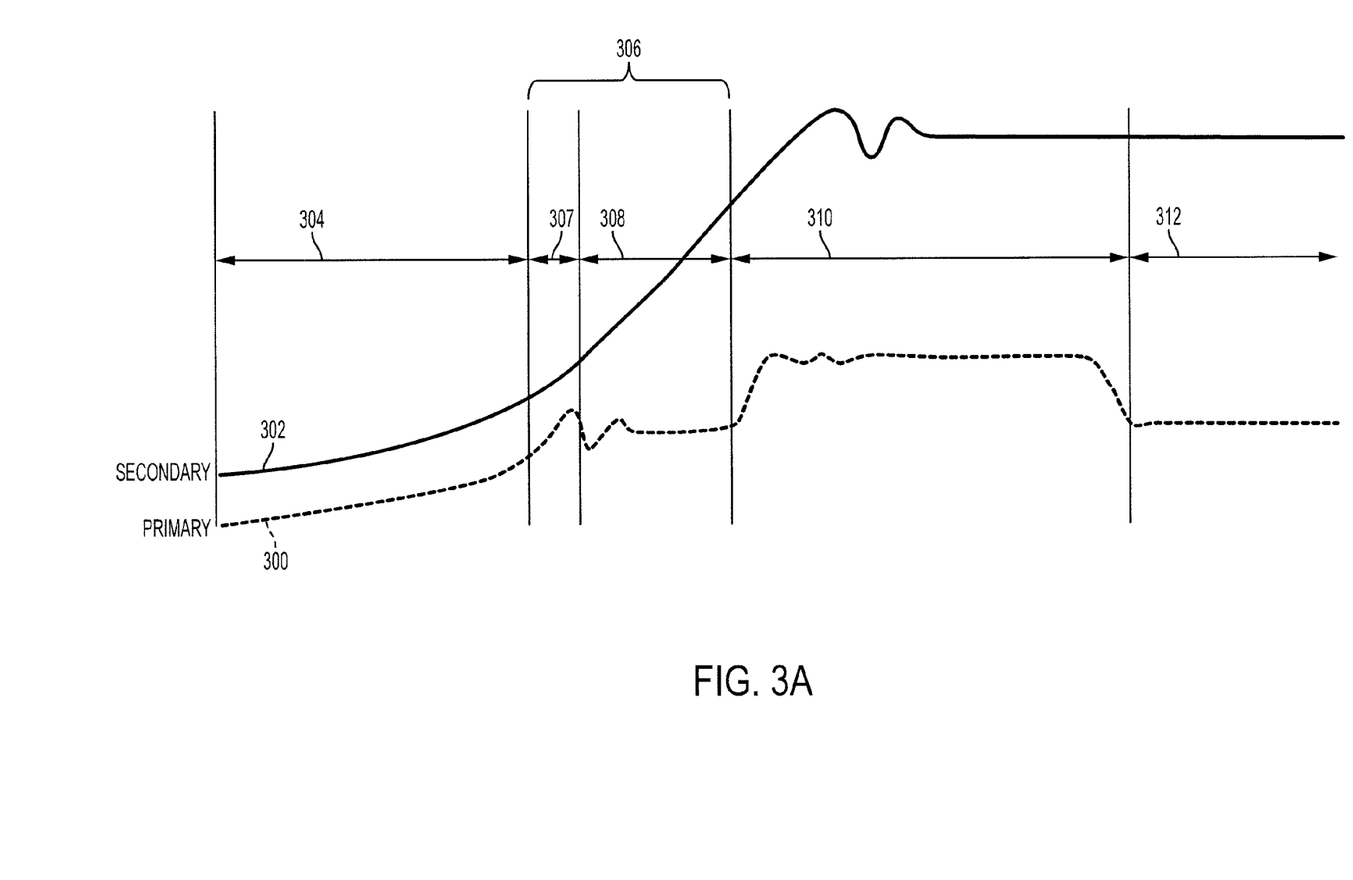
FIG. 3A is a time plot showing pressures within a primary oil chamber and a secondary oil chamber over time to illustrate various phases of vehicle startup according to some embodiments of the present disclosure.

During startup of the vehicle 100, the transmission 102 may have numerous phases. FIGS. 3A through 3E are used to illustrate these phases. FIG. 3A is a time chart illustrating the pressure within the secondary oil chamber 222, as shown by the line 302, and the pressure within the primary oil chamber 212, as shown by the line 300, over a period of time. In FIG. 3A, the line 300 and the line 302 are on different scales such that the values illustrated by lines 300 and 302 may be relatively similar throughout a first phase 304 and a second phase 306. FIGS. 3B through 3E are block diagrams illustrating the configuration of the transmission during four phases of startup.

Figure 3B:
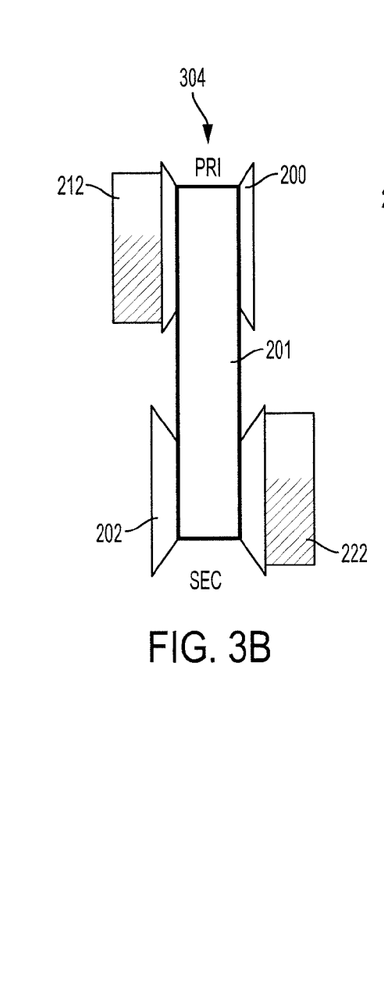
FIG. 3B is a block diagram illustrating a first phase of vehicle startup according to some embodiments of the present disclosure.

With reference now to FIGS. 3A and 3B, in the first phase 304, the primary oil chamber 212 and the secondary oil chamber 222 are receiving oil. However, during the first phase 304, the cavities defined by the primary oil chamber 212 and the secondary oil chamber 222 are not yet full of fluid. As shown, the pressure within the primary oil chamber 212 and the secondary oil chamber 222 gradually increases throughout the first phase 304.

Figure 3C:
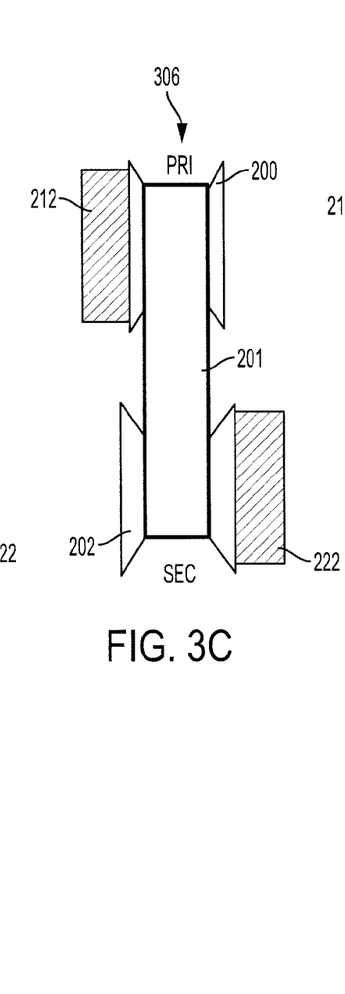
FIG. 3C is a block diagram illustrating a second phase of vehicle startup according to some embodiments of the present disclosure.

With reference now to FIGS. 3A, and 3C, at the beginning of the second phase 306, both of the oil chambers are full of oil and thus the pressures increase more rapidly. The second phase 306 is divided into a first part 307 and a second part 308. During the first part 307 of the second phase 306, the pressures within both the primary oil chamber 212 and the secondary oil chamber 222 are increasing as oil is being forced into the chambers.

At the end of the first part 307 and the beginning of the second part 308, the oil within the primary oil chamber 212 has reached a target oil pressure. Thus, fluid may no longer be pumped into the primary oil chamber 212 and the pressure should remain constant. With brief reference now to FIGS. 1 and 2, in order for the transmission 102 to be configured in a maximum gear ratio, the pitch radius 240 of the primary pulley assembly 200 should be at a minimum and the pitch radius 242 of the secondary pulley assembly 202 should be at a maximum. To achieve this configuration, the thrust force applied by the pressure within the secondary oil chamber 222 should be set so that the transmission tends to shift towards a maximum gear ratio state. Thus, the pressure within the secondary oil chamber 222 may increase for a longer period of time and to a greater pressure than the pressure within the primary oil chamber 212.

Returning to FIGS. 3A and 3C, during the second part 308 of the second phase 306, the pressure within the primary oil chamber 212 remains substantially constant while the pressure within the secondary oil chamber 222 continues to increase.

Figure 3D:
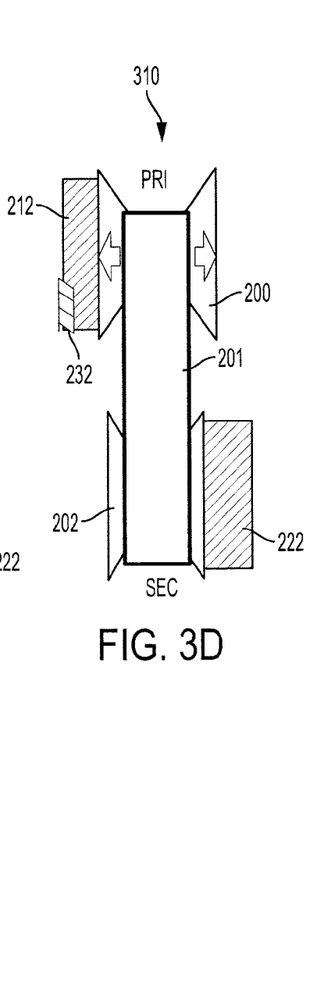
FIG. 3D is a block diagram illustrating a third phase of vehicle startup according to some embodiments of the present disclosure.

With reference now to FIGS. 2, 3A and 3D, at the beginning of the third phase 310, the pressure within the secondary oil chamber 222 may be sufficiently great that the thrust force from the secondary pulley assembly 202 creates a tension in the drive belt 201 such that a separating force on the primary pulley assembly 200 exceeds the thrust force generated by the pressure in the primary oil chamber 212. If the transmission 102 is at the maximum gear ratio, the primary fixed pulley 204 and/or the primary sliding pulley 206 may be in contact with the mechanical stop 232. When the primary pulley assembly 200 is in contact with the mechanical stop 232, tension applied to the drive belt 201 does not transfer through the primary pulley assembly 200 to the primary oil chamber 212. Thus, when the transmission 102 is set to the maximum gear ratio during startup, the third phase 310 does not occur.

However, if the transmission 102 is not at the maximum gear ratio, the tension of the drive belt 201 is transferred through the primary pulley assembly 200, forcing the primary sliding pulley 206 apart from the primary fixed pulley 204. This separation force is also applied to the primary oil chamber, causing the pressure within the primary oil chamber 212 to increase. The increase in pressure in the primary oil chamber 212 causes the total pressure in the primary oil chamber 212 to be greater than the target oil pressure. Thus, when this increased pressure is detected, it can be assumed that the transmission 102 is not set to the maximum gear ratio.

Figure 3E:
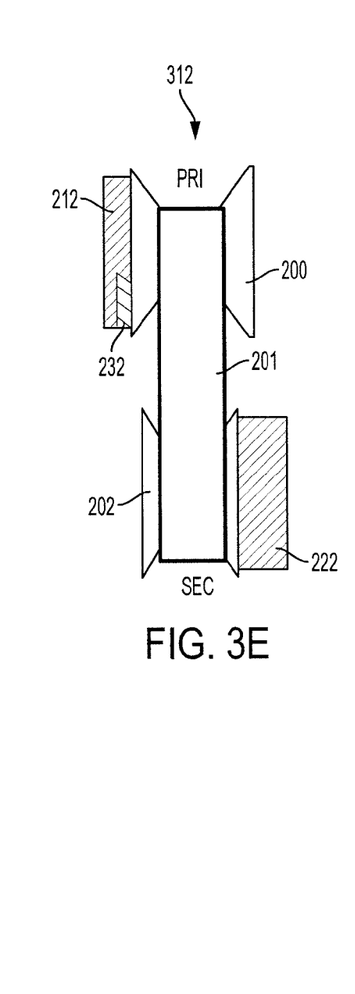
FIG. 3E is a block diagram illustrating a fourth phase of vehicle startup according to some embodiments of the present disclosure.

With reference now to FIGS. 3A and 3E, at the beginning of the fourth phase 312, the primary pulley assembly 200 has reached its position corresponding to the maximum gear ratio. At this point, the primary sliding pulley 206 may be resting against the mechanical stop 232 such that additional tension applied to the drive belt 201 does not transfer through the primary pulley assembly 200 to the primary oil chamber 212. The fourth phase 312 can be detected by the return of the pressure within the primary oil chamber 212 to a pressure near the target primary pressure.

Thus, and with reference to FIGS. 1 and 2, the primary pressure sensor 220 can be used to determine whether the transmission 102 is set to the maximum gear ratio. The primary pressure sensor 220 and the secondary pressure sensor 230 may also provide additional benefits. Traditionally, the ECU 106 may rely on calculated gear ratios or other systems to determine how to control the pressures within the oil chambers to achieve desired gear ratios. The inclusion of pressure sensors allows the ECU 106 to receive and utilize detected pressures within the oil chambers for the pressure control systems. Systems utilizing the pressure sensors may more accurately control the pressures than use of traditional systems. Even if not more accurate, the detected pressures can be used as feedback devices for the traditional pressure control systems.

Figure 4:
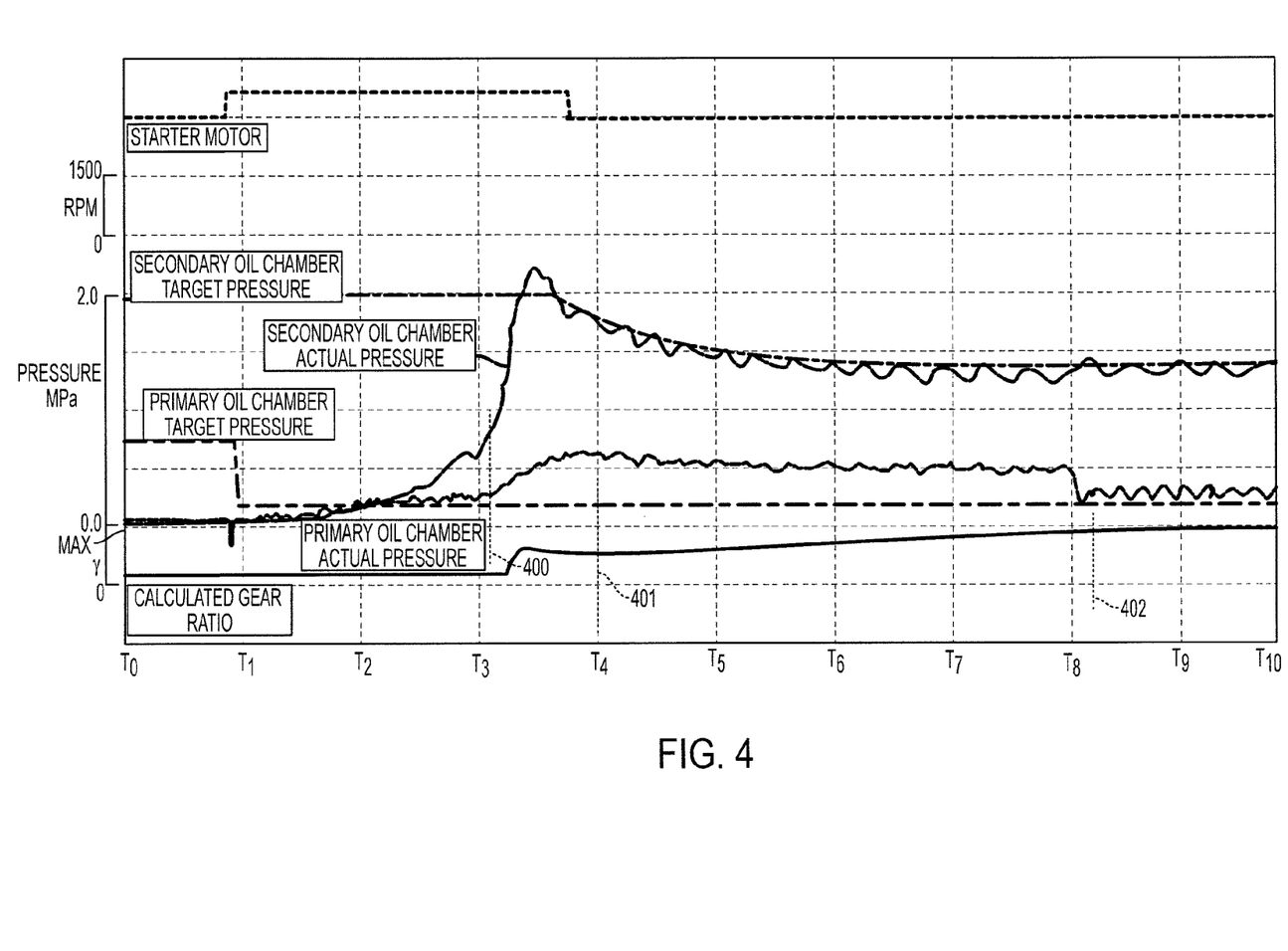
FIG. 4 is a time chart illustrating actual and target pressures within a primary and a secondary oil chamber over a period of time according to some embodiments of the present disclosure.

With reference now to FIGS. 1, 2 and 4, this concept is further explained using a time chart illustrating values of the starter motor 105, a speed of the engine 104, a target pressure of the secondary pulley assembly 202, the actual pressure of the secondary pulley assembly 202, a target gear ratio of the primary pulley assembly 200, an actual pressure of the primary pulley assembly 200, and a gear ratio determined by using the primary angular velocity sensor 211 and the secondary angular velocity sensor 221.

Immediately before time $T_1$, the starter motor 105 begins to turn. The ECU 106 may then set a target pressure for the secondary pulley assembly 202 and the primary pulley assembly 200 that correspond to pressures that will cause the transmission 102 to be set to the maximum gear ratio. Accordingly, the pressure within the primary oil chamber 212 and the pressure within the secondary oil chamber 222 both increase from about time $T_1$ to shortly after time $T_2$. The first part of this increase corresponds to the first phase and the second part of this increase corresponds to the first part of the second phase.

Shortly after time $T_2$, the pressure of the primary oil chamber 212 has approximately reached the target pressure for the primary oil chamber 212. Accordingly, the ECU 106 or another component may prevent additional oil from pumping into the primary oil chamber 212. For example, in some embodiments the ECU 106 may instruct the primary oil pump 214 to stop pumping oil. In some embodiments, oil from a pressure control valve supplied by an oil pump may control the oil pressure in the primary oil chamber 212 and, thus, the pressure control valve may prevent the additional oil from pumping into the primary oil chamber 212. However, the pressure within the secondary oil chamber 222 has not yet reached its target pressure, so it continues to increase until some point between time $T_3$ and time $T_4$. This period of increasing pressure within the secondary oil chamber 222 and constant pressure within the primary oil chamber 212 corresponds to the second part of the second phase.

At time marker 400, immediately after time $T_3$, the pressure within the primary oil chamber 212 begins to increase to a value above its target pressure. Based on this increase, the ECU 106 can determine that the primary pulley system is not in its position that corresponds to the maximum gear ratio. This is because the pressure increase indicates that the primary fixed pulley 204 and the primary sliding pulley 206 are being separated in response to the tension applied to the drive belt 201. Thus, time marker 400 corresponds to the beginning of the third phase. At this point, the ECU 106 may implement controls for protecting the drive belt 201 and/or the pulley systems.

The target pressure for the secondary oil chamber 222 may be set to a value that is above the value that corresponds to the maximum gear ratio. The ECU 106 may set the target pressure high in order to ensure the transmission 102 shifts to the maximum gear ratio. Once the detected pressure reaches the target pressure, the target pressure may begin to decrease, as shown in FIG. 4.

Shortly after the time marker 400 and before time $T_4$, the primary angular velocity sensor 211 and the secondary angular velocity sensor 221 may begin to detect angular velocities. As described above, the angular velocity sensors may be incapable of detecting angular velocities below a certain level. Accordingly, the ECU 106 can begin to calculate the gear ratio using the detected angular velocities. As shown, after the initial increase in the calculated gear ratio, the calculated gear ratio value begins to decrease. It is known that the actual gear ratio is not decreasing because, during this time, the pitch radius 240 of the primary pulley assembly 200 is decreasing towards the maximum gear ratio. Thus, the calculated gear ratio at this point is inaccurate and the ECU 106 cannot accurately calculate a gear ratio of the transmission 102 based on the detected angular velocities. At time marker 401, the calculated gear ratio begins to increase indicating that the calculated gear ratio is accurate. At time marker 402, the calculated gear ratio reaches a constant value indicating that the transmission 102 is at the maximum gear ratio.

Provided the data shown in FIG. 4, the ECU 106 can determine that the vehicle 100 is not in the maximum gear ratio at time marker 400. This is due to the fact that the detected pressure within the primary oil chamber 212 is significantly greater than the target pressure. Accordingly, at time marker 400, the ECU 106 may invoke one or more control systems to prevent unnecessary wear to the pulley assemblies and/or the drive belt 201.

Figure 5:
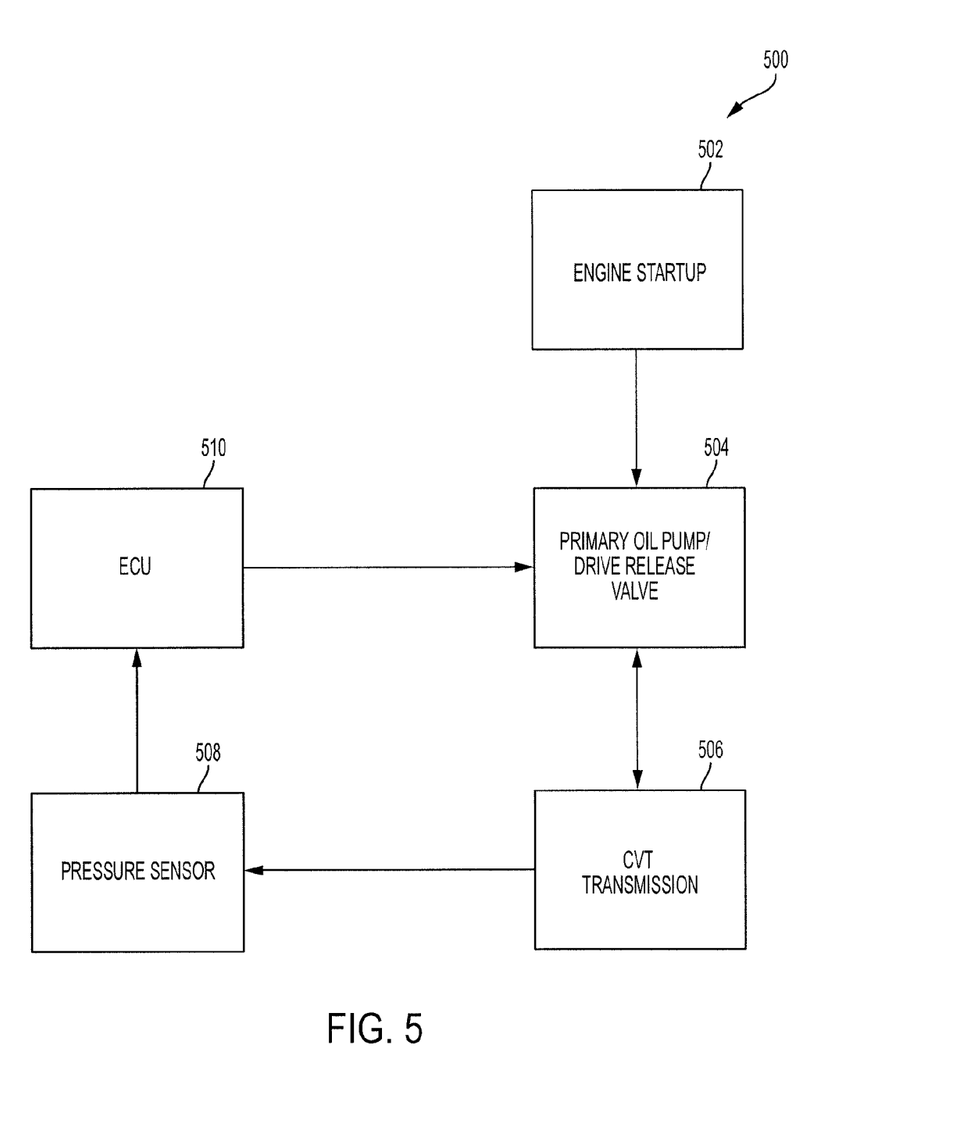
FIG. 5 is a block diagram illustrating a control system for determining whether a transmission is operating at a maximum gear ratio during and after engine startup according to some embodiments of the present disclosure.

FIG. 5 illustrates a feedback control system 500 for controlling a vehicle, such as the vehicle 100 of FIG. 1, during startup of the vehicle. In control block 502, a starter motor may begin to operate, causing an engine to start. In block 504, an oil pump and/or a release valve of the primary pulley assembly of the vehicle can control an amount of pressure within a primary oil chamber of the vehicle. The change in pressure of the primary oil chamber may affect the positioning of the primary pulley assembly, shown by the gear ratio of the transmission in block 506. The positioning of the primary pulley assembly (i.e., the separation of the two pulleys) can, in turn, affect the pressure within the primary oil chamber.

In control block 508, the pressure sensor can detect a pressure of the primary oil chamber of the transmission. The detected pressure is then provided to the ECU. In control block 510, the ECU may determine whether or not the transmission is in a maximum gear ratio based on the detected pressure. In turn, the ECU may control the primary oil pump, the primary release valve, or any other component of the transmission, as well as other components of the vehicle, in order to prevent unnecessary wear of the transmission. Such traditional vehicles not utilizing a pressure sensor in a primary oil chamber do not have this detected pressure data and, thus, the startup control systems for these vehicles may not include feedback.

Figure 6:
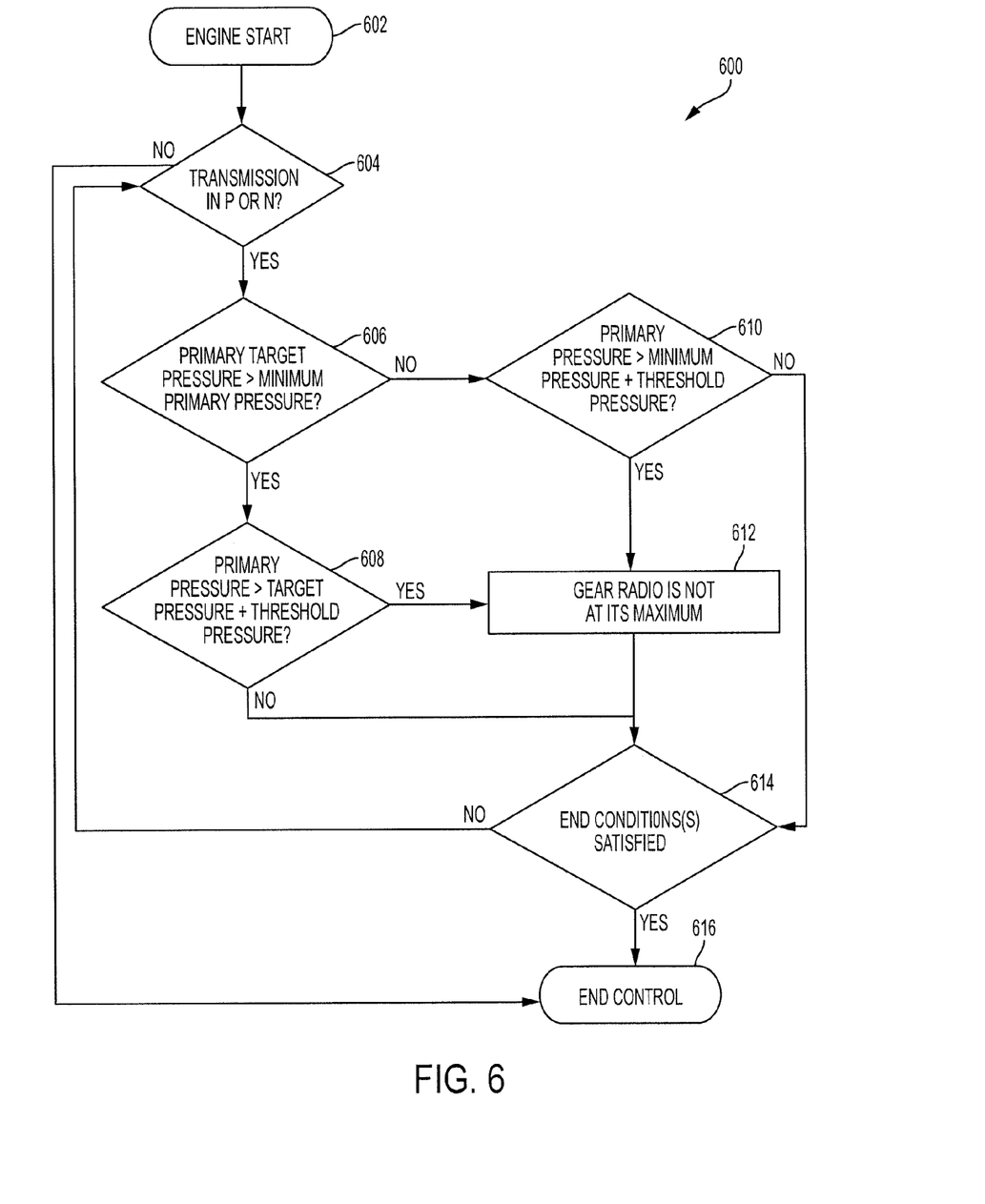
FIG. 6 is a flow chart illustrating a method for use by an electronic control unit to determine whether a transmission is operating at a maximum gear ratio during and after startup according to some embodiments of the present disclosure.

FIG. 6 illustrates a method 600 for determining whether a transmission of a vehicle, such as the transmission 102 of the vehicle 100 of FIG. 1, is set to a maximum gear ratio during and/or after startup. The method 600 may be performed by a vehicle ECU, such as the ECU 106 of FIG. 1. In block 602, the engine may start in response to an ignition request from a driver.

In block 604, the vehicle may determine whether a gear shifter, such as the gear shifter 112, is in a park position or a neutral position. If the transmission is not in a park or a neutral position, the driver may be requesting power from the transmission and engine so that the vehicle can be driven. Thus, the method 600 may end in block 616 to ensure that the ECU allows the power to be transferred to the wheels. However, if the transmission is in a park or a neutral position, the method 600 may proceed to block 606.

Each oil chamber has a minimum oil pressure that is based on mechanical properties of various components, such as an oil pump and/or a release valve of the transmission. In block 606, the ECU may determine whether a target pressure of a primary oil chamber, such as the primary oil chamber 212 of FIG. 2, is greater than a minimum oil pressure within the primary oil chamber. If the target pressure is not above the minimum pressure, this indicates that the signal coming from the ECU may be incorrect, a target primary pressure is not yet set, the primary pressure is intended to be zero, or the like. Thus, when the target is not above the minimum oil pressure, the minimum oil pressure can be considered the target, as the oil chamber should at least have the minimum oil pressure.

In block 608, the method 600 includes determining whether the detected pressure within the primary oil chamber is greater than a sum of the target pressure of the primary oil chamber and a threshold pressure. A yes result indicates that the transmission is operating in the third phase and, thus, the transmission is not operating at the maximum gear ratio. In some embodiments, the threshold pressure may be a percentage of the target pressure, a predetermined amount of pressure, or the like. For example, the threshold pressure may be 10% of the target pressure. In that regard, the ECU will determine that the detected pressure within the primary oil chamber is greater than the target pressure plus the threshold pressure if the detected pressure within the primary oil chamber reaches or exceeds the sum of the target pressure plus 10% of the target pressure.

In block 610, the ECU may determine whether the detected pressure within the primary oil chamber is greater than the minimum pressure plus a threshold pressure. The threshold pressure may again be a percentage of the minimum pressure, a predetermined amount of pressure, or the like. Because the target primary pressure may be zero, a detected pressure that is significantly above the target indicates that the transmission is operating in the third phase and, thus, the transmission is not in the maximum gear ratio.

In block 612, as a result of a yes determination from either block 608 or block 610, the ECU may determine that the transmission is not functioning at the maximum gear ratio. Accordingly, the ECU may perform other logic to protect the pulley assemblies and/or the drive belt. For example, the ECU may prevent torque from being applied to the transmission.

In block 614, the ECU may determine whether an end condition has been satisfied. The end condition may indicate that it is no longer necessary to determine whether the transmission is set to the maximum gear ratio.

The end condition may also include determining whether a calculated gear ratio using the angular velocity sensors is determined to be accurate. If the calculated gear ratio is accurate, the calculated gear ratio can be used as input for the ECU instead of or in addition to the detected oil pressures.

Another end condition may include determining whether a predetermined time has expired from a start of the engine. A time period may be determined during which the transmission can shift from any gear ratio to the maximum gear ratio. Thus, after this amount of time expires after startup of the vehicle, it can be assumed that the gear ratio is at the maximum gear ratio.

The end condition may also include determining whether the primary oil pressure has been substantially equal to the target primary oil pressure for a predetermined amount of time, which indicates that the transmission is not operating in the third phase. This can be a result of the transmission being set to the maximum gear ratio. Thus, when the primary pressure is substantially equal to the target pressure for a predetermined amount of time, it can be assumed that the transmission is operating at the maximum gear ratio.

As another end condition, the ECU may determine whether another method of determining gear ratios indicates that the gear ratio is at a maximum. For example, the ECU may receive a detected linear position of a shaft of the primary pulley assembly. If another method of determining whether the transmission is at the maximum gear ratio indicates that it is at the maximum gear ratio, it can be assumed that the transmission is operating at the maximum gear ratio.

The end condition may also include determining whether the ignition of the vehicle has been switched to an off state. If the vehicle is turned off, the transmission may not receive power from the engine, and thus the control may end.

Another end condition may include determining a speed of the vehicle. It may not be desirable for the transmission to operate in the maximum gear ratio of the vehicle is traveling at or above a predetermined speed. For example, such a gear ratio may over-spin the engine at or above the predetermined speed.

The end condition may also include determining whether a driver is depressing the acceleration pedal. As with the above, if the driver is requesting acceleration, the ECU should allow the vehicle to accelerate.

In some embodiments, some or all of the end conditions must be satisfied in order to end the control of the method 600. In some embodiments, one or more of the end conditions must be satisfied in series and/or in parallel with one or more other end conditions.

Figure 7:
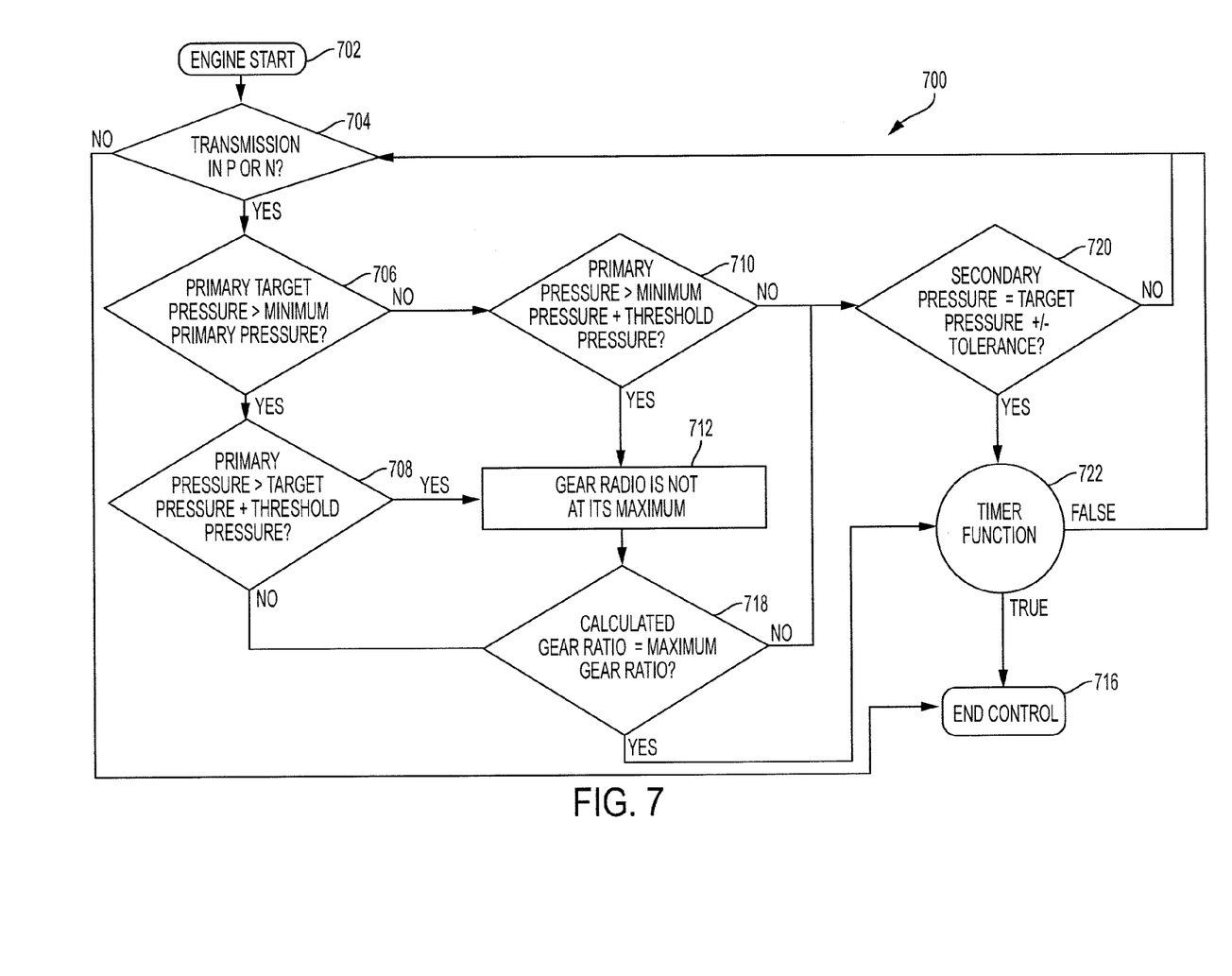
FIG. 7 is a flow chart illustrating a method for use by an electronic control unit to determine whether a transmission is operating at a maximum gear ratio during and after startup that includes multiple end conditions according to some embodiments of the present disclosure.

For example and with reference to FIG. 7, some end conditions are included in a method 700. Each of blocks 702, 704, 706, 708, 710, 712, and 716 function in the same manner as the corresponding blocks of the method 600. However, the method 700 includes block 718 and block 720 as end condition blocks. The timer function in block 722 ensures that either end condition is satisfied for a predetermined amount of time. For example, the control may end if the result of block 718 remains a "yes" for the predetermined amount of time.

In block 718, the ECU may determine whether the calculated gear ratio is equal to the maximum gear ratio. The calculated gear ratio, as previously discussed, may be determined using angular velocity sensors adjacent to each of the pulley assembly's. If the calculated gear ratio is substantially equal to the maximum gear ratio for a predetermined amount of time, the ECU may assume that the angular velocity sensors are functioning properly and that, based on the calculation, the transmission is in the maximum gear ratio.

In block 720, the ECU may determine whether the pressure within the secondary oil chamber is near a target pressure of the secondary oil chamber. When the actual pressure in the secondary oil chamber is substantially the same as the target pressure of the secondary oil chamber, startup of the engine may be at or near completion. Thus, if the result of block 720 remains a "yes" for a predetermined amount of time, the transmission is likely set to a maximum gear ratio and the control can end.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for determining whether a transmission of a vehicle is set to a maximum gear ratio during startup comprising:
   a continuously variable transmission having a primary pulley assembly configured to receive power and including a primary fixed pulley and a primary sliding pulley, a primary oil chamber coupled to the primary pulley assembly such that pressure of oil within the primary oil chamber is applied to the primary pulley assembly, a secondary pulley assembly including a secondary fixed pulley and a secondary sliding pulley, and a drive belt configured to transfer the power from the primary pulley assembly to the secondary pulley assembly;
   a pressure sensor coupled to the primary oil chamber and configured to detect a pressure of the oil within the primary oil chamber; and
   an electronic control unit coupled to the pressure sensor and configured to:
      determine a target pressure of the oil within the primary oil chamber, and
      determine that the continuously variable transmission is set to a gear ratio other than the maximum gear ratio when the detected pressure of the oil within the primary oil chamber is greater than a sum of the target pressure of the oil within the primary oil chamber and a predetermined threshold.

2. The system of claim 1 wherein the predetermined threshold is at least one of a predetermined amount of pressure, a predetermined percentage of the detected pressure, or a predetermined percentage of the target pressure.

3. The system of claim 1 wherein the electronic control unit is further configured to determine whether the target pressure of the primary oil chamber is less than a minimum pressure of the primary oil chamber and, if so, to determine that the continuously variable transmission is set to the gear ratio other than the maximum gear ratio when the detected pressure of the oil in the primary oil chamber is greater than a sum of the minimum pressure of the primary oil chamber and the predetermined threshold.

4. The system of claim 1 further comprising a secondary pressure sensor and wherein:
   the continuously variable transmission further includes a secondary oil chamber coupled to the secondary pulley assembly such that pressure of oil within the secondary oil chamber is applied to the secondary pulley assembly, the secondary oil chamber being further coupled to the secondary pressure sensor such that the secondary pressure sensor can detect the pressure of the oil in the secondary oil chamber,
   the electronic control unit is further configured to determine a secondary target pressure of the oil in the secondary oil chamber, and the electronic control unit is further configured to stop determining whether the continuously variable transmission is set to the maximum gear ratio based on the detected pressure of the oil within the primary oil chamber when the detected pressure of the oil in the secondary oil chamber is within a predetermined tolerance of the secondary target pressure of the oil in the secondary oil chamber for a predetermined amount of time.

5. The system of claim 1 wherein the electronic control unit is further configured to stop determining whether the continuously variable transmission is set to the maximum gear ratio based on the detected pressure of the oil within the primary oil chamber when at least one of:
the electronic control unit determines that an engine of the vehicle has been on for a predetermined amount of time,
the electronic control unit calculates a supplemental gear ratio based on equipment other than the pressure sensor that is equal to the maximum gear ratio,
the electronic control unit determines that the detected pressure within the primary oil chamber is substantially equal to the target pressure of the oil within the primary oil chamber for a predetermined amount of time,
the electronic control unit determines that an ignition switch of the vehicle is in an off position;
the electronic control unit determines that a speed of the vehicle is greater than a predetermined speed, or
the electronic control unit determines that an accelerator pedal of the vehicle is being depressed.

6. The system of claim 1 further comprising a gear shifter and wherein the electronic control unit is further configured to stop determining whether the continuously variable transmission is set to the maximum gear ratio based on the detected pressure of the oil within the primary oil chamber when the gear shifter is set to a gear other than a park gear or a neutral gear.

7. The system of claim 1 wherein the electronic control unit is further configured to perform a function to protect the drive belt when the electronic control unit determines that the continuously variable transmission is set to the gear ratio other than the maximum gear ratio.

8. A system for determining whether a transmission of a vehicle is set to a maximum gear ratio during startup comprising:
a continuously variable transmission having a primary pulley assembly configured to receive power and including a primary fixed pulley and a primary sliding pulley, a primary oil chamber coupled to the primary pulley assembly such that pressure of oil within the primary oil chamber is applied to the primary pulley assembly, a secondary pulley assembly including a secondary fixed pulley and a secondary sliding pulley, and a drive belt configured to transfer the power from the primary pulley assembly to the secondary pulley assembly;
a pressure sensor coupled to the primary oil chamber and configured to detect a pressure of the oil within the primary oil chamber; and
an electronic control unit coupled to the pressure sensor and configured to determine whether a target pressure of the primary oil chamber is less than a minimum pressure of the primary oil chamber and, if so, determine that the continuously variable transmission is set to a gear ratio other than the maximum gear ratio when the detected pressure of the oil in the primary oil chamber is greater than a sum of the minimum pressure of the primary oil chamber and a predetermined threshold.

9. The system of claim 8 wherein the predetermined threshold is at least one of a predetermined amount of pressure, a predetermined percentage of the detected pressure, or a predetermined percentage of the target pressure.

10. The system of claim 1 further comprising a secondary pressure sensor and wherein:
the continuously variable transmission further includes a secondary oil chamber coupled to the secondary pulley assembly such that pressure of oil within the secondary oil chamber is applied to the secondary pulley assembly, the secondary oil chamber being further coupled to the secondary pressure sensor such that the secondary pressure sensor can detect the pressure of the oil in the secondary oil chamber,
the electronic control unit is further configured to determine a secondary target pressure of the oil in the secondary oil chamber, and
the electronic control unit is further configured to stop determining whether the continuously variable transmission is set to the maximum gear ratio based on the detected pressure of the oil within the primary oil chamber when the detected pressure of the oil in the secondary oil chamber is within a predetermined tolerance of the secondary target pressure of the oil in the secondary oil chamber for a predetermined amount of time.

11. The system of claim 1 wherein the electronic control unit is further configured to stop determining whether the continuously variable transmission is set to the maximum gear ratio based on the detected pressure of the oil within the primary oil chamber when at least one of:
the electronic control unit determines that an engine of the vehicle has been on for a predetermined amount of time,
the electronic control unit calculates a supplemental gear ratio based on equipment other than the pressure sensor that is equal to the maximum gear ratio,
the electronic control unit determines that the detected pressure within the primary oil chamber is substantially equal to the target pressure of the oil within the primary oil chamber for a predetermined amount of time,
the electronic control unit determines that an ignition switch of the vehicle is in an off position;
the electronic control unit determines that a speed of the vehicle is greater than a predetermined speed, or
the electronic control unit determines that an accelerator pedal of the vehicle is being depressed.

12. The system of claim 1 further comprising a gear shifter and wherein the electronic control unit is further configured to stop determining whether the continuously variable transmission is set to the maximum gear ratio based on the detected pressure of the oil within the primary oil chamber when the gear shifter is set to a gear other than a park gear or a neutral gear.

13. The system of claim 1 wherein the electronic control unit is further configured to perform a function to protect the drive belt when the electronic control unit determines that the continuously variable transmission is set to the gear ratio other than the maximum gear ratio.

* * * * *